Oct. 13, 1964          J. R. HACKMAN          3,152,602
                CONTINUOUS OPTIMAL CONTROLLER
Filed June 14, 1961                        4 Sheets-Sheet 1

INVENTOR.
JAMES R. HACKMAN

BY *Harry J. McCauley*

ATTORNEY

United States Patent Office 3,152,602
Patented Oct. 13, 1964

3,152,602
CONTINUOUS OPTIMAL CONTROLLER
James R. Hackman, Concordville, Pa., assignor to E. I. du Pont de Nemours and Company, Wilmington, Del., a corporation of Delaware
Filed June 14, 1961, Ser. No. 117,152
5 Claims. (Cl. 137—92)

This invention relates to a continuous type optimal process controller, and particularly to a continuous type optimal process controller which is largely, or, alternatively, entirely of the pneumatic type.

A number of chemical manufacturing processes are characterized by the existence of well-defined maxima, minima or other distinctive criticalities of operative parameters which afford indices upon which to base control of the processes. The adherence of control action to a sharp peak, valley or other well-defined region of operation existent in the variation of a parameter from one extreme of process operation to the other extreme can be succinctly described as "optimal," and the term "optimal" is employed in this context in the following description.

Attempts have been made to provide optimal controllers operating according to various control patterns; however, these have not been very satisfactory, because they are completely electronic, or electro-mechanical, in design and very complicated in construction, which makes them expensive, unreliable, difficult to maintain, not adapted to explosion proofing and otherwise deficient. There has been developed an improved intermittent optimal controller, which is described in U.S. application S.N. 117,151, filed on the same date herewith, and the invention of this application constitutes a continuous type optimal controller.

Figure 1:
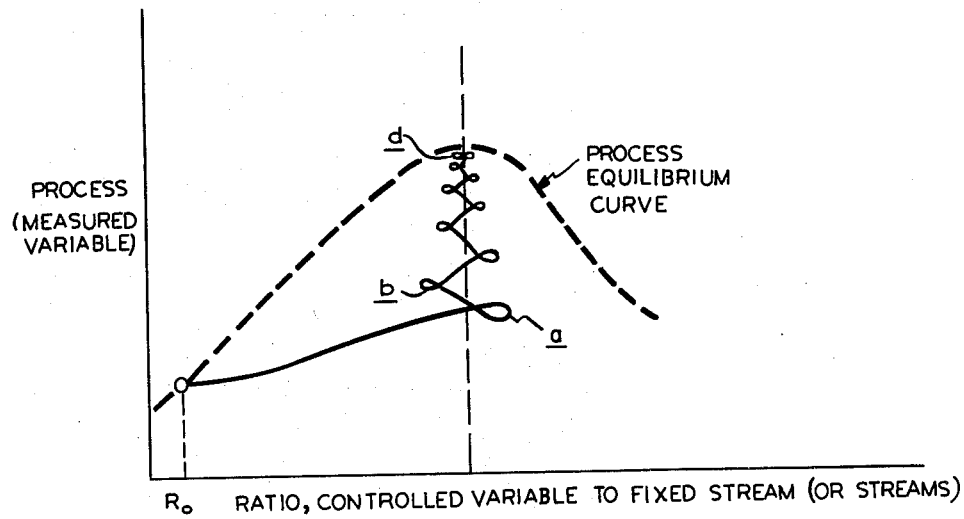
Figure 3:
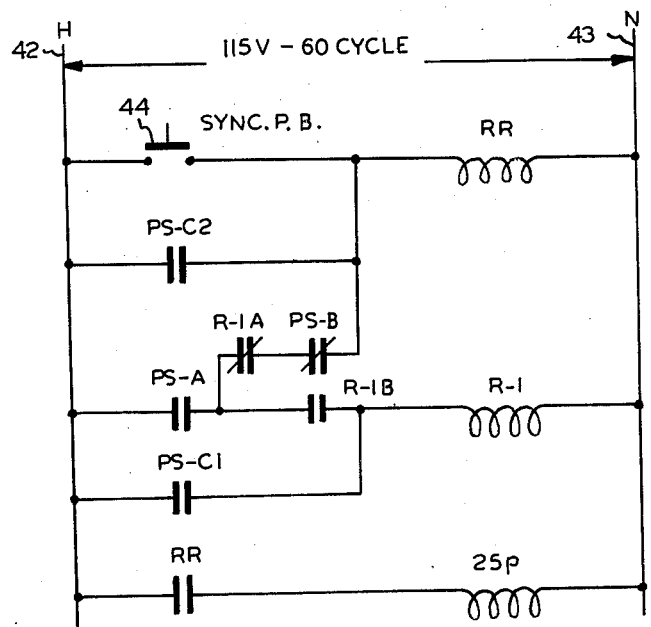
Figure 2:
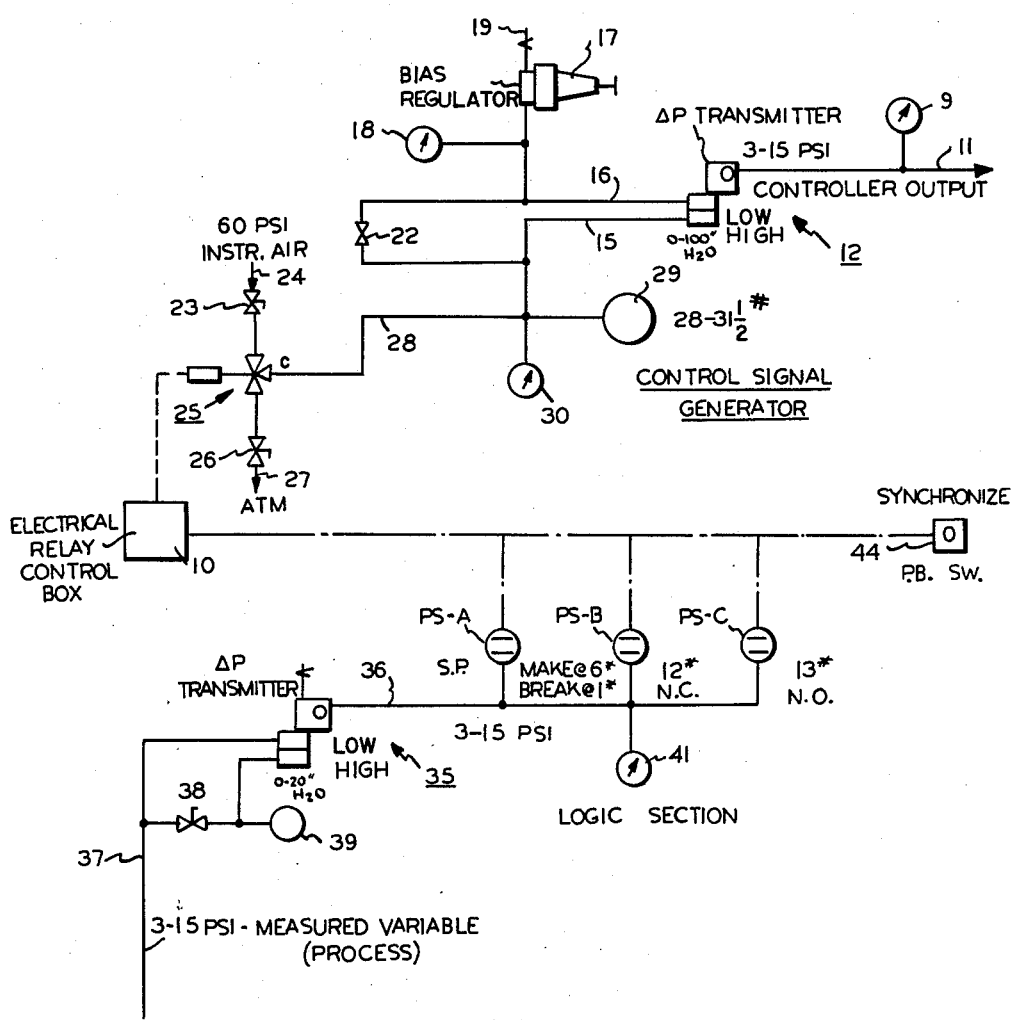
Figure 4:
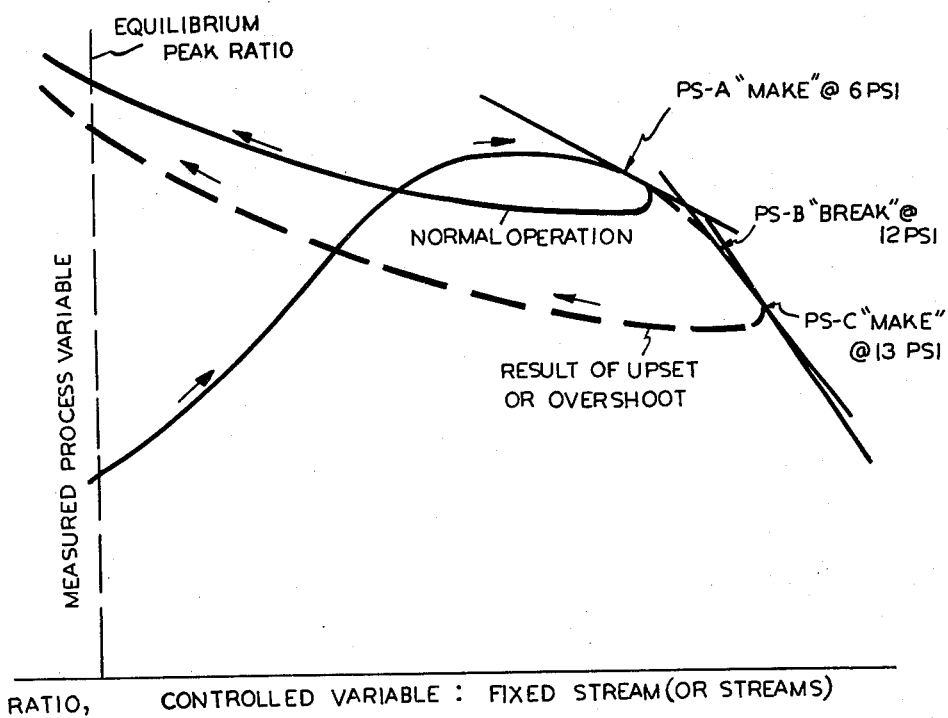
Figure 5:
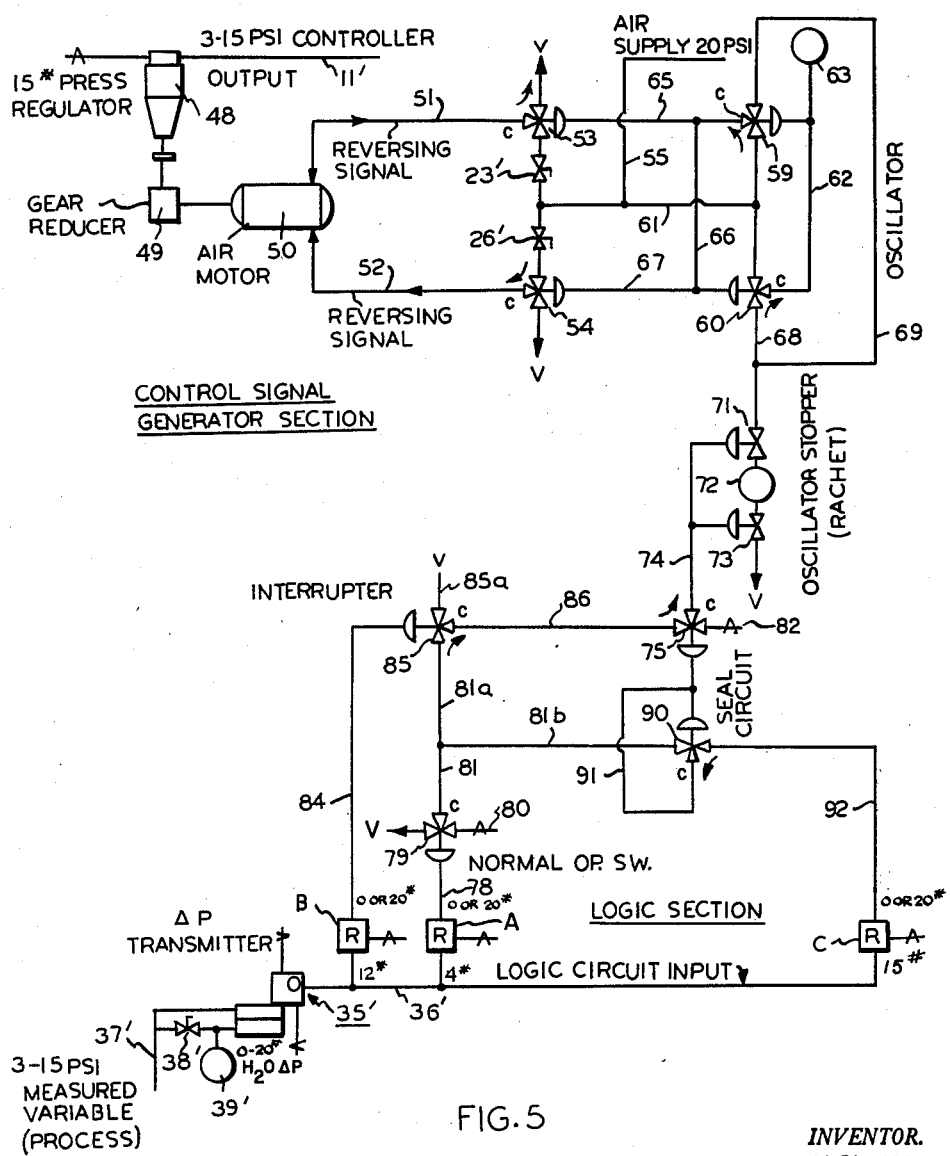

An object of this invention is to provide an improved optimal process controller which is largely, or, optionally completely, of pneumatic design. Another object of this invention is to provide an optimal process controller which is low in first cost and maintenance, of very high reliability in operation and of high precision performance. The manner in which these and other objects of this invention are obtained will become apparent from the detailed description and the following drawings, in which:

FIG. 1 is an actual traced representation of the overall control action according to this invention wherein the process displays a maxima upon which control is to be based, FIG. 2 is a schematic representation of a preferred embodiment of controller wherein most of the components are pneumatic but several electrical relays are employed in conjunction therewith, all pneumatic lines being shown in solid convention whereas the electrical lines are in broken convention, FIG. 3 is a schematic representation of the electrical circuit for the apparatus of FIG. 2, FIG. 4 is a diagrammatic representation of a single reversal in the control action of the apparatus of FIGS. 2 and 3, and FIG. 5 is a schematic representation of a second embodiment of this invention which is all-pneumatic in design.

Generally, this invention comprises a continuous optimal process controller comprising, in combination, a pneumatic logic section adapted to sense both the fact of and the rate of a change in the process variable with reference to which control is based in a direction away from the optimum selected for control and to generate an output signal distinctive as to the direction of change in the process variable, and a pneumatic control signal generation section responsive to the output signal from the logic section adapted to generate a control signal adjusting a controlled variable in the process to reverse the direction of change of said controlled variable when the process variable is deviating from the optimum selected for control, the pneumatic control signal generation section being provided with means enabling preselection of the rate of adjustment of the controlled variable in either a negative or a positive slope sense.

For purposes of explanation, process control to a maxima existing in the process equilibrium curve is chosen as the example, as shown in FIG. 1. Such a process is one where a single ingredient is varied to maintain the process, which is the measured variable, plotted as ordinate, as closely as possible to the optimum condition, i.e., the maxima in the process equilibrium curve, by controlling the ratio of a single ingredient supply rate with respect to the fixed supply rates of the other ingredients going into the reaction, which is the controlled variable, plotted as abscissa.

The over-all control action according to this invention follows a succession of ramps which progressively decrease in amplitude, referred to the abscissa, until the final control is achieved as indicated by the twin-lobed lemniscate at $d$ in the immediate region of the maximum upon which control is to be based. A typical process to which the optimal controller is applicable is a polymerization wherein there occurs a polymer viscosity peak at a certain stoichiometric relationship of reagents. In such a case, the measured variable plotted on the ordinate axis of FIG. 1 would be viscosity, whereas the controlled variable is the ratio of an ingredient responsible for the viscosity to all other ingredients entering into the reaction and supplied at a constant rate plotted as the asbscissa.

In FIG. 1 control commences at a ratio $R_0$, whereupon the controlled variable is continuously increased (or "ramped up") until point $a$ is reached. Since the desired maximum point has been passed by, it is necessary to reverse the action by continuously decreasing the controlled variable as the next step in the progression and, accordingly, the controlled variable is "ramped down," i.e., (brought past the value corresponding to the process equilibrium maximum in the opposite direction) until point $b$ is reached. Thereafter, the control cycle described is repeated successively and automatically until the final average level is reached near the peak condition denoted at $d$. The controller then operates continuously, repeating its minimum amplitude cycle of region $d$ and maintaining the process in control to retain maximum viscosity during the remainder of operation.

The embodiment of controller shown in FIGS. 2 and 3 is substantially entirely pneumatic in design, with the exception of a simple electrical relay circuit which is provided to operate a valve cyclically, a concession made to facilitate the use of a popular commercial type of cycle valve. As indicated in part in FIG. 2, the apparatus can be conveniently considered to consist, in combination of a control signal generator section, or ramp function generator, which is generally that sub-combination shown above the electrical relay control box 10, a logic section and a ratchet mechanism co-ordinating operation of one section with the other.

The purpose of the ramp function generator is to create the 3–15 p.s.i. pneumatic output signal of the controller which is delivered via output line 11 to provide both a rate of change and a direction of change of the controlled variable. The output signal is indicated on pressure gage 9. The pneumatic "ramp function" is generated by slowly varying the input signal to the differential pressure transmitter, indicated generally at 12. It is practicable to utilize a transmitter 12 calibrated in the range 0–100″ $H_2O$, corresponding to approximately 3.5 lbs. differential pressure input, to obtain a 3–15 p.s.i.g. output. In order to obtain a linear operating increment with instrument air supplied at 60 p.s.i.g. as hereinafter described, it is preferred to operate within a relatively high input pressure range of typically from about 28–31.5 p.s.i.g., imposed on the high side of transmitter 12 through pressure line 15, counter to which a bias signal of 28 p.s.i.g. is applied to the low pressure side through pressure line 16. This bias pressure is supplied by a conventional pressure regulator 17, connected to the plant air supply via line 19, provided on the output side with a pressure gage 18 indicating the amount of existing bias pressure.

The rate of change of controlled variable (i.e., positive or negative slope of ramp depicted in FIG. 1) is established by the remaining components of the ramp function generator. These include a needle valve 23 connected between a 60 p.s.i.g. source of instrument air supplied by line 24 and one port of a 3-way solenoid valve 25, and another needle valve 26 connected between another port of valve 25 and a vent 27 to atmosphere. The remaining port of 25 is connected through line 28 with an air capacity tank 29 and also direct to line 15. In all of the figures, the 3-way valves have been consistently drawn with their common ports, denoted $c$, oriented in the same convention opposite the valve operators. Solenoid valve 25 is of the usual construction, i.e., spring-biased to connect one of the lines 24 or 27 (in the actual example described, line 24) to common port $c$ when the solenoid is de-energized and the other to $c$ when energized. A pressure gage 30 indicates the pressure carried in line 28 and in all components in open communication therewith.

The directional of signal change (or ramp function) is controlled by operation of solenoid valve 25 responsive to the logic section of FIG. 2 through the agency of the ratchet mechanism. The logic section comprises a differential pressure transmitter 35, which is typically adapted to deliver a 3–15 p.s.i.g. output through air pressure line 36 in order to operate individual ones of the three pressure switches PS-A, PS-B and PS-C at their respective preadjusted pressure settings. For the installation described, PS-A is a normally open contact type making at 6 p.s.i.g. and breaking at 1.0 p.s.i.g., PS-B is a normally closed contact type making and breaking at 12 p.s.i.g., and PS-C is a normally open contact type making and breaking at 13 ps.i.g., the latter being provided with two sets of contacts denoted PS-C1 and PS-C2, respectively, in the following description. A pressure gage 41 is provided in open communication with line 36 to give visual indication of the pressure existing therein. The low pressure side of the input of transmitter 35 is connected direct to a transducer (not shown) via line 37, to thereby sense the measured process variable which, in this instance, is the viscosity. The high pressure side of the input is also connected to line 37, but through needle valve 38. An air capacity tank 39 is provided in open communication with the piping between the transmitter 35 and needle valve 38. Typically, transmitter 35 is calibrated at 0–20" $H_2O$ to supply a 3–15 lb. p.s.i.g. output.

Since control activity in the case where control is based on a maximum involves intervention only when the sensed process variable is going downwards, a plus signal is required from transmitter 35, i.e., some output above 3 p.s.i.g., only at this time, whereas all other times a zero signal, i.e., 3 p.s.i.g. or below, is necessary. Moreover, it is essential that the rate of process variable change in a downward direction be constantly ascertained in order to reserve control to a region outside of the process "noise" band. This rate measurement is also performed by transmitter 35 and its associated R.-C. time delay appurtenances, in that the magnitude of its pressure signal output is a function of the rate of change of the process variable, it being understood that the only meaningful rate of concern in the apparatus of the example is that where the process variable is in downward trend, which is accompanied by an opposite, or rising output, of the transmitter.

The entire electrical control circuit for the apparatus of FIG. 2, inclusive of the ratchet mechanism, is detailed in FIG. 3. The power supply energizing the solenoid of valve 25 is typically 115 v.–60 c. A.-C. derived from electrical lines 42 and 43, with a set of reversing relay contacts RR connected in series ahead of the solenoid coil 25$p$ of solenoid valve 25. Two relay coils, RR and R–1, respectively, are connected across lines 42 and 43, each in parallel connection with respect to the other and also with respect to 25$p$, and both being housed in electrical relay control box 10. RR is typically a ratchet type reversing relay, the contact settings of which reverse, i.e., open or close, each time the coil is energized. Such a relay incorporates a spring-loaded armature which is pulled in when the relay coil is energized, the armature being provided with a pawl finger which indexes a ratchet wheel, together with the shaft keyed thereto, a fraction of a revolution. The shaft is provided with a cam which engages the contact leaves of the relay, i.e., contacts RR, and closes the electrical circuit therethrough. De-energization of the relay causes retraction of the armature and its pawl finger, but does not disturb the cam position, and there is thus required another relay energization to index the ratchet one more step, moving the cam contact actuator correspondingly and thereby opening the contact leaves as the next operation in sequence, to complete the switching cycle.

R–1 is a single pole, double-throw, 115 v. A.-C. relay provided with the two sets of contacts denoted R–1A and R–1B. Relay R–1 has connected in series with it the normally open PS–A and R–1B contacts, both of which are, however, shunted by the set of normally open relay contacts PS–C1. Reversing relay RR is connected in series with the synchronizing pushbutton switch 44, which is of the normally open, momentary contact type, the latter being shunted by the pair of normally open PS–C2 contacts. Finally, the relay sub-circuits are co-ordinated one with another in by normally closed contacts R–1A and PS–B connected in series from between contacts PS–A and R–1B, on the one hand, to between PS–C2 and relay coil RR on the other.

The operation of the controller of this invention is a function of two characteristics of the measured process variable (in this case viscosity), namely: (1) the rate of change of the measured process variable and (2) the direction of this change. The control action, as shown in FIG. 1, involves continuously changing the rate of supply of the ingredient flow chosen as responsible for the viscosity, i.e., the ratio plotted along the abscissa, and, in addition, reversing the direction of change only when it is sensed that the viscosity is decreasing. As previously mentioned, the control action of the apparatus is safeguarded against process noise by the rate of change of process variable perception afforded by the differential transmitter 35. Thus, if a relatively slow downward change in the process variable, characteristic of process noise, occurs, transmitter 35 will be insensitive to it and its output signal remains at, or only slightly above, the 3 p.s.i.g. level corresponding to zero; however, if a relatively rapid downward change in process variable ensues, transmitter 35 generates an output signal above 3 p.s.i.g. of magnitude proportional to the rate of change of the process variable, and controller intervention then occurs as hereinafter described. It should be mentioned that any "blind spots" in the process, which might erroneously mask a slow rate of process variable change as inconsequential, are quickly uncovered by the deliberate continual variation of the controlled variable, because, if the trend developing is of a type which it is essential to cope with in the control interest, its rate will rapidly increase at some point during the control traverse, thereupon bringing about speedy corrective action, even though the condition evidenced itself at the outset only as an ambiguous, slow rate drift. The net result is that supply of the viscosity-responsible ingredient is over-all in a direction and amount bringing it ultimately to the point where optimum viscosity (the maximum) is preserved. The control imposed is thus one of peak-seeking, wherein, within sensitivity limitations, as long as the process measurement is changing upwards, the direction of change of the controlled variable remains the same. The somewhat larger amplitudes of cyclic change at the lower end of the process equilibrium curve are due to the reduction in sensitivity here incident to the steepening of the process curve in these regions.

In summary, control according to this embodiment of the invention involves continuously driving the process forwards and backwards across the abscissa corresponding to the peak process condition, whereupon the process is ultimately operated at some average condition relatively close to peak level, once the controller has been afforded the time to overtake the process from the instant when it is switched in. In the actual example of FIG. 1 only four complete control cycles were required for the controller to arrive at point $d$ which, in this instance, took only about 15 minutes, corresponding to an approximate thousand-fold increase in the viscosity. The proximity of the final refined control to the peak depends upon the "noise" level of process measurement and, in general, it will be understood that noisy or erratic process measurement requires that the reversal point of the controlled variable direction be far enough from peak condition to obtain reliability.

The rate of change of the controlled variable is fixed by presetting the controller in accordance with the known process dynamics. Thus, some processes inherently respond to control in an unambiguous manner more quickly than others, and these can be provided with a faster rate of change presetting, whereas other processes require a slower rate of change approach to control imposition.

The rate of change, or ramp slope, is fixed by appropriate manual adjustment of needle valves 23 and 26 and the size of air capacity tank 29. Needle valve 23 adjusts the "up" rate, or slope, and needle valve 26 adjusts the "down" rate or negative slope, both rates being adjustable independently of each other and to high degrees of precision.

The direction of change of the controlled variable is effected by operation of 3-way solenoid valve 25 responsive to the logic section and, consequently, operation of the latter is described first. The nature of the control requires only that solenoid valve 25 be energized or de-energized, as the case may be, each time the process variable change is downward at a predetermined rate, and this is accomplished by the ratchet relay and associated electrical switching circuit of FIG. 3 under control of differential pressure transmitter 35.

The sensing of change in the process variable is effected by the time delay action of the needle valve 38, air capacity tank 39 connection to the high side of transmitter 35, which, together, are analogous to an R-C electrical network. This time delay action causes the signal on one side of transmitter 35 to lag in time the signal applied to the other side, which reveals that change has occurred from the equilibrium condition in which the process variable (viscosity) remains substantially unchanged. Typically, as the transducer pressure decreases, corresponding to a decrease in viscosity, a lower signal pressure exists in line 37 which, due to the time lag in pressure application to the high side of transmitter 35 as a result of the restrictive effect of needle valve 38 combined with the capacity of tank 39, increases the output pressure in line 36. Consequently, the pressure within line 36 rises from the equilibrium value of about 3 lbs./sq. in. to some higher level. In order to avoid hunting, PS-A is set to make at 6 lbs. p.s.i.g. and, when this pressure is reached, the contacts PS-A of FIG. 3 close, energizing reversing relay RR through normally closed contact pairs R-1A and PS-B, thereby closing contacts RR and energizing the solenoid 25p of valve 25, to reverse its setting from its previous state.

When the effect of the reversal in setting of valve 25 is evidenced by a rise in pressure in line 37 applied to transmitter 35, the time lag of valve 38-capacity 39 will be exerted in an opposite sense to that hereinbefore described, and the pressure within line 36 falls to 1 p.s.i.g., or even as far as zero, by leak-off of air therein through the pilot valve bleed-off of transmitter 35. This opens the contacts of PS-A, which is set to break at 1 p.s.i.g., and the former condition of equilibrium is restored with the pressure in line 36 gradually leveling out at about 3 p.s.i.g., until the next significant change in transducer output occurs. From the foregoing, it is apparent that a single pressure switch is all that is required to effect control in the manner described; however, process upsets or random "process noise" pulses which are not incident to normal process conduct make it desirable to incorporate safeguards in the form of the additional pressure switches PS-B and PS-C.

The desirability of incorporating the safeguard switches PS-B and PS-C arises from the fact that the PS-A contacts close only when the process variable is going down, whereas they open only when the process variable is on the increase. It is possible that a process upset could occur in the time interval between the make and break of PS-A contacts and thus drive the process progressively further downwards away from the the optimum peak. This situation is illustrated as occurring in the reversal portrayed in FIG. 4, wherein the control pattern is shown as not adhering to the normal solid line course in the direction of the arrows, but, instead, overshooting along the broken line curve after the making of the PS-A contacts at 6 p.s.i.g. responsive to the (exaggerated) process equilibrium curve slope attainment sketched in as shown.

As the output pressure rises above 6 p.s.i.g., switch PS-B eventually breaks at 12 p.s.i.g. This immediately opens contacts PS-B, thereby de-energizing relay RR, with concomitant re-setting of its ratchet mechanism. However, since the RR contacts reverse only when relay RR is energized, the next following energization must come from some other agency than PS-A, namely, PS-C. Thus, when the pressure in line 36 increases further, to 13 p.s.i.g., both pairs of contacts PS-C1 and PS-C2 close. The closing of PS-C2 contacts energizes relay RR, reversing its contacts, i.e., closing RR contacts if they were previously open or opening them if they were previously closely. Accordingly, energization and de-energization of solenoid valve coil 25p is governed by the closing and opening, respectively, of the RR relay contacts.

At the same time, to avoid any possibility of interference with the verified process condition, contacts PS-C1 close, energizing relay R-1, which seals in this relay by closure of its contacts R-1B, simultaneously maintaining open the contacts R-1A to isolate relay RR from any effects from elsewhere than as interposed. Both pairs of PS-C contacts open at 13 p.s.i.g. as the pressure drops in line 36, thereby de-energizing relay RR (and re-setting its ratchet mechanism), but R-1 remains sealed in by its own closed R-1B contacts for the entire time until contacts PS-A open at 1 p.s.i.g. in line 36. At this time the contacts R-1B open as a result of de-energization of relay R-1 and the controller is restored to its original state, ready for the next cycle of operation, having surmounted the overshoot disturbance with only relatively minor deviation from the normal control pattern.

The operation of the controller as a whole involves, cyclically, the build-up of pressure from the 60 p.s.i.g. air source 24 through needle valve 23 into line 28, as indicated by the uppermost downwardly directed arrow adjacent valve 25 (FIG. 2), followed by venting to the atmosphere through needle valve 26, as indicated by the lowermost downwardly directed arrow. The time sequence in which these events occur is controlled solely by the logic section, as hereinbefore described.

As an aid to rapid buildup of pressure in the air capacity tank 29, a normally closed shut-off valve 22 is provided in direct connection with pressure regulator 17, which can be momentarily opened by the operator when the controller is first put into operation in order to bring the pressure in line 28 to the 28 p.s.i.g. level without delay, after which valve 22 is again closed. The purpose of the synchronizing pushbutton switch 44 is simply to energize the RR coil and actuate its contact ratchet to thereby energize or de-energize, so that the controller is immediately coordinated with the process, as indicated by pressure gage 30.

The all-pneumatic embodiment of this invention detailed schematically in FIG. 5 consists also of a logic section in combination with a control signal generator (or ramp function generator), co-ordinated by a ratchet mechanism, the latter consisting of a pneumatic oscillator provided with an oscillator stopper, or ratchet.

The controller output is, for this embodiment, a 3–15 p.s.i.g. air signal delivered through output line 11' (the equivalent of line 11, FIG. 2), which is derived from pressure regulator 48, typically delivering 15 lbs. maximum. The valve of this regulator is continuously adjusted by rotary air motor 50 through gear reducer 49, and the direction of operation of motor 50 is controlled by signals applied through air lines 51 and 52 connected to the common ports c of each of the 3-way diaphragm-actuated valves 53 and 54, respectively, which function as reversing switches. Each of these switching valves is provided with a needle valve 23' for valve 53 and 26' for valve 54, which are equivalent to valves 23 and 26 respectively, of FIG. 2, and the operating air supply for motor 50 is supplied, through the switching valves, from line 55 at a pressure of, typically, 20 p.s.i.g. The remaining ports of valves 53 and 54 vent to the atmosphere.

The oscillator per se comprises two 3-way diaphragm-actuated valves 59 and 60, which are connected in a regenerative circuit with the diaphragh of each in circuit with the air output of the other. The operating air supply for the oscillator is also derived from line 55 via branch line 61, which divides to connect with one port of each of the 3-way valves 59 and 60. The line 62 connecting the output side of 3-way valve 60 to the diaphragm of 3-way valve 59 is provided with an air capacity tank 63, and the output side of valve 59 is connected to the diaphragm of valve 53 via line 65 and to the diaphragms of both valves 54 and 60 via lines 66 and 67. Air discharge from the oscillator occurs as hereinafter described through lines 68 connecting with the oscillator stopper and crosstie line 69 provided between 68 and the remaining port of 3-way valve 59.

The oscillator stopper or ratchet comprises an air lock consisting of diaphragm-actuated through valve 71, opening typically at 15 p.s.i.g., connected in series with a diaphragm-actuated through valve 73, closing typically at 12 p.s.i.g., with an air capacity tank 72 interposed between the two valves. The actuator diaphragms of both valves 71 and 73 are connected to the output (c) side of the 3-way diaphragm-actuated valve 75 of the logic circuit through line 74, the remaining port of valve 75 being connected to a 20 p.s.i.g. air source via line 82.

The logic circuit closely parallels the logic circuit hereinbefore described for the first embodiment, comprising a differential pressure transmitter 35' identical with 35, provided with a time lag adjunct consisting of needle valve 38' and air capacity tank 39' both connected to the high side, and deriving a 3–15 p.s.i.g. measured variable signal via line 37' equivalent to line 37. The output line 36' from transmitter 35' is equivalent to line 36, FIG. 2, and connects to the control sides of the three snap-acting pneumatic relays, A, B, and C corresponding, respectively, to the pressure switches PS–A, PS–B and PS–C, FIG. 2. Typically, relay A is set at 4 p.s.i.g., B at 12 p.s.i.g. and C at 15 p.s.i.g. All of the relays deliver 0 or 20 p.s.i.g. signals at their "off" and "on" positions, respectively.

The output of relay A is imposed through line 78 on the diaphragm of 3-way valve 79 through line 78, one of the ports of which is connected to an air supply of typically 20 p.s.i.g. via line 80, whereas another port is vented to atmosphere and the common port c delivers the operating air signal via line 81. Valve 79 delivers the normal on-off signals dictated by transmitter 35', which is all that is required to effect normal ramp output reversals; however, the remaining components are desirable as a safeguard against abnormalities in operation such as hereinbefore detailed for the first embodiment.

Thus, pneumatic relay B connected through line 84 to the diaphragm of 3-way valve 85, interposed in circuit via common port c with lines 81a and 86 between valve 79 and valve 75, with its remaining port 85a vented to atmosphere, serves as an interrupter to "break" relay A signals when the process rate of fall exceeds normal. The "seal" circuit, in over-riding control of valve 75, consists of 3-way diaphragm-actuated valve 90 connected with its diaphragm in open communication with the diaphragm of valve 75 and also, via line 91, with its common port c. The remaining ports of valve 90 are connected via line 92 with the output of pneumatic relay C and via line 81b (and 81) with normal operating switch valve 79. The co-ordinated settings of all switching valves of the entire apparatus for one phase of operation are indicated by arrows drawn in adjacent to each.

As will become apparent from the following description, it is essential that the air lock capacity tank 72 be proportioned to accept into temporary hold-up storage the air exhausted from the diaphragm actuators of valves 53, 54 and 60 together with that from the piping in communication therewith, while maintaining sufficient pressure applicable to the diaphragm of valve 59 to maintain the latter in actuation during this particular stage of oscillator operation. Air capacity tank 63 can then be proportioned with respect to the predetermined capacity of 72 so that approximately equal capacities exist in the oscillator system for both phases of the operating cycle.

The operation of the embodiment of FIG. 5 is based on the alternating delivery of either a zero or a full 20 p.s.i.g. signal from the logic circuit to the oscillator stopper, or ratchet. Thus, as the transducer pressure sensed via line 37' drops, indicating a decrease in the process variable, the output of differential pressure transmitter 35' rises and, at 4 p.s.i.g., pneumatic relay A is triggered, which thereupon switches valve 79 from its normal zero output pressure connection to vent to the full 20 p.s.i.g. pressure of source 80. Interrupter valve 85 being at this time in open setting with respect to lines 81a and 86, a 20 lb. signal is immediately applied through the similarly open ports of valve 75 to line 74 and the actuating diaphragms of both of the valves 71 and 73.

Valve 73, which normally is connected to vent air capacity tank 72 to atmosphere, is closed first, because of its lower set pressure of 12 p.s.i.g., and a short time thereafter valve 71 (set point 15 p.s.i.g.) opens, to establish open communication between tank 72 and air discharge line 68. Oscillator valve 60, being at this time in its position establishing communication between lines 62 and 68, as indicated by the arrow adjacent thereto, immediately drops the pressure on air capacity tank 63 and simultaneously on the diaphragm-actuator of valve 59. The latter thereupon opens to the air pressure source, permitting full air pressure application to the diaphragm-actuators of reversing switch valves 53 and 54 and also to oscillator valve 60 via lines 55, 61, 65 and 66, and 67.

This action simultaneously reverses the rotational direction of air motor 50 and operates oscillator valve 60 to break its connection with line 68 and open connection through common port c with air pressure supply lines 55 and 61. Air is now supplied to air capacity tank 63 and also to the actuator of valve 59, which latter, however, does not change position immediately because of inertia in the system.

Reversal of rotation of air motor 50 is accomplished by reversal of vent and supply air to each of valves 53 and 54 sequentially. Prior to the application of air pressure to the actuator of valve 53 as hereinbefore described, air supply to motor 50 was from air supply line 55 via needle valve 26', valve 54 and line 52 to produce rotation and accompanying movement of the valve of regulator 48 in one given direction. The system action hereinbefore described changes this by supply of air through needle valve 23', valve 53 and line 51 with concomitant change of position of valve 54 to connect line 52 to vent. This drives the valve of regulator 48, through gear reducer 49, in the opposite direction, altering the pressure maintained in line 11', so as to effect a reversal in the changing of the controlled variable to effect the desired increase in the process (measured) variable.

Continued oscillation of the oscillator section is effectively halted by the air lock-maintained air pressure build-up within air capacity tank 72. This air pressure build-up is opposed to the diaphragm-actuators of valves 53, 54 and 60 when oscillator valve 59 changes its position to connect its common port c with lines 69 and 68 and air capacity tank 72. Subsequent closure of valve 71 as hereinafter described locks the oscillator against further operation unless dictated by the logic circuit as a new operating cycle.

It is thus seen that one zero condition plus pressure signal from 3-way valve switch 79 effectively impels the oscillator through one-half of its cycle. Once this reversal in trend is manifested by an increase of pressure in line 37' the output from line 36' drops, by leak-off of air therein through the pilot valve bleed-off of differential pressure transmitter 35'. Relay A then snaps off, permitting valve 79 to revert to its normal atmospheric venting. This immediately relieves the pressure in line 74 through open valves 75 and 85, which removes air from the diaphragm-actuators of valves 71 and 73 of the oscillator stopper, whereupon valve 71 closes and valve 73 opens in the sequence recited. Air capacity tank 72 is thus vented to atmosphere and the air lock restored to a state permitting it to repeat its ratchet function.

The next pressure pulse from 79, under normal conditions, requires a reversal in ramp direction and will be signalled through relay A in exactly the same manner as hereinbefore described, to actuate the oscillator stopper to repeat its operation exactly as hereinbefore described. However, now the settings of valves 59 and 60 are reversed from those existing at the beginning of the previous oscillator half-cycle, so that, now, the diaphragm-actuators of the three valves 53, 54 and 60 are all connected through their respective lines 65, 67 and 66 (and valve 59) to line 69 and thence to the oscillator stopper. Accordingly, the pressure on all of the diaphragm-actuators immediately drops below valve position maintenance level and reversing switch valve 53 closes to needle valve 23' and opens to vent, reversing switch valve 54 opens to needle valve 26' and valve 60 of the oscillator is restored to its original position connecting valve 59 to air capacity tank 72, the air lock still maintaining the pressure on the actuator of the latter valve at a sufficiently high level to stop the oscillator on this phase of its cycle. Motor operating air is now supplied via line 55, needle valve 26', reversing switch valve 54 and line 52, and vented through reversing switch valve 53 via line 51, to operate air motor 50 in the reverse direction from its immediately previous direction and another reversal in ratio change direction is obtained. This brings the oscillator to the end of the second half-cycle of its operation, corresponding, again, to one zero state plus one pressure plate of valve 79, and the oscillator is restored once more to its condition at the beginning of the description of oscillator operation hereinbefore set forth. The foregoing is a complete description of normal control operation; however, as hereinbefore described for the embodiment of FIGS. 2 and 3, safeguards are provided against abnormal operation as well.

Thus, if for any reason the pressure in line 36' should continue to rise following actuation of pressure relay A, pressure relay B will be actuated at the 12 p.s.i.g. pressure level. This immediately actuates interrupter valve 85 to switch its setting so that line 86, line 74 and the diaphragm-actuators of valves 73 and 71 are all vented to atmosphere through 85a. Further pressure rise in line 36' ultimately triggers pressure relay C at the 15 p.s.i.g. preset level, which delivers a 20 p.s.i.g. signal via line 92 through seal valve 90 into line 91, which effects actuation of both valves 75 and 90 by application of pressure to their diaphragms. Switching of valve 75 impresses 20 p.s.i.g. operating air from line 82 on the oscillator stopper, effectively ratcheting the oscillator one step, thereby accomplishing the same function as described for PS–C of the first embodiment. The setting of valve 90 then shifts to connect line 81b to line 91, thus maintaining seal-in pressure on the diaphragm-actuator of 90 for the entire period that relay A remains in "on" position. The pressure in line 36' then starts to fall and, at 12 p.s.i.g. level, interrupter valve 85 reverts to its normal position establishing connection between lines 81, 81a and 86. However, this can have no effect, because valve 75 remains closed to line 86. The pressure in line 36' continues to drop until the 4 p.s.i.g. operating level of relay A is reached. Valve 79 then operates to connect lines 81, 81a, 81b, and 91 to atmospheric pressure, breaking the seal circuit applied to valve 90, and the entire apparatus is restored to its original state in readiness for the next cycle of operation.

The all-pneumatic embodiment of this invention is somewhat less preferred than the electro-pneumatic embodiment described first, for the reason that it is possible that sufficient air leakage past the ports of valves 59 and 60 can occur to cause unintended operation of the oscillator. However, for processes which have a fast response, this is not a serious problem and, even for processes with a slow response, can be solved by resort to the normal skill of the art. Leakage interference can, of course, be completely eliminated by substitution of the new "solid-state" pneumatic analog counterparts of electrical components just now being introduced to the market wherever the problem exists.

While the embodiment of this invention hereinbefore described in detail controlled on a maxima as optimum, obviously a minima can be guided on equally effectively. In addition, it is possible to choose any given point on the process equilibrium curve, or rather, as a practical matter, as close to the curve as the process noise band permits, and control to this point by ramping the process down when a preselected slope above this point is encountered and ramping the process up when a preselected slope below this point is encountered. Under these circumstances, the lemniscate-type closed curve of control activity corresponding to d, FIG. 1, lies more or less closely to the process equilibrium curve, with one loop above the preselected control point and one loop below and with the lemniscate inclined at some angle to the abscissa. This method of control operates identically as already described with respect to FIG. 4, except that cooperating process variable reversal tangent lines are pre-selected between which the control activity oscillates. Thus, for example, if a "down" ramp reversal point is chosen at a 7 lb. differential transmitter output pressure and an "up" ramp reversal point is chosen at a 9 lb. differential transmitter output (both to the right of maximum of a process equilibrium curve such as that shown in FIG. 1), it is clear that control can be constrained between these limits at a general preselected average of about 8 lbs. To safeguard against overshoot as described with reference to FIG. 4, each of these points could be backed up with pressure switches corresponding to PS–B and PS–C, FIG. 2, operating at set points of 6 and 5 lbs., respectively, for the 7 lb. "down" ramp reversal and 10 and 11 lbs., respectively, for the 9 lb. "up" ramp reversal. One additional item of information is necessary to operation and that is assurance that control is always confined to reference to the chosen side of the process equilibrium curve. This assurance can be obtained in various ways known to the art, a preferred way being a reliance on digital logic. Thus, two related conditions must obtain for control to be based on a given side of the process as hereinbefore described, namely: (1) a positive or negative signal (referred to the 3 lb. zero level output) of the differential pressure transmitter and (2) characteristic energization, or de-energization, of the solenoid control valve 25 corresponding, respectively, to ramping up and ramping down. Various combinations of standard apparatus components can be readily assembled for obtaining the described assurance, as will be apparent to persons skilled in the art.

A relatively wide range of individual component equivalents exists for design choice in particular controller installations, and the foregoing examples are advanced solely for purposes of description and not as limiting. Thus, instead of an electrical reversing relay, an electropneumatic device incorporating the conventional flapper and bleed nozzle construction can be readily substituted to develop the necessary plus and zero air signals directly. Also, it is entirely feasible to substitute a diaphragm-operated mechanical ratchet for the oscillator and oscillator stopper of FIG. 5 with resulting simplification and perhaps increase in reliablity of this part of the system if desired.

From the foregoing, it will be understood that this invention can be modified in numerous respects without departure from its essential spirit, and it is intended to be limited only within the scope of the appended claims.

What is claimed is:

1. A continuous optimal process controller comprising, in combination, a pneumatic logic section sensing both the fact of and the rate of a change in the process variable displaying an optimum inherent in said process with reference to which control is based in a direction away from said optimum and generating an output signal distinctive as to said direction of said change in said process variable, and a pneumatic control signal generation section responsive to said output signal from said logic section generating a control signal adjusting a controlled variable in the process to reverse the direction of change of said controlled variable when said process variable is deviating from said optimum selected for control, said pneumatic control signal generation section being provided with means enabling preselection of the rate of adjustment of said controlled variable in either a negative or a positive slope sense.

2. A continuous optimal process controller according to claim 1 wherein each pneumatic logic section comprises a differential pressure transmitter receiving as input a pressure signal which is a function of the magnitude of said process variable with reference to which control is based, said differential pressure transmitter being connected at both input sides in circuit applying said pressure signal to each, but with one of said input sides provided with a pneumatic R-C time delay means of a magnitude preselected to develop said output signal distinctive as to the rate of said change in said process variable in a predetermined direction.

3. A continuous optimal process controller comprising in combination a pneumatic logic section provided with a differential pressure transmitter connected with both inputs receiving a pressure signal which is a functon of the magnitude of said process variable with reference to which control is based, one of said inputs being provided with a pneumatic R-C time delay means of a magnitude sufficient to develop an output signal from said transmitter distinctive as to deviation and rate of deviation of said process variable away from the optimum inherent in said process selected for control, a pneumatic control signal generation section generating a control signal adjusting a controlled variable in the process provided with means enabling preselection of the rate of adjustment of said controlled variable in either a negative or positive slope sense, and ratchet means in control circuit with said pneumatic control signal generation section and responsive to said logic section imposing a reversing action on said pneumatic control signal generation section reversing the direction of change of said controlled variable when said process variable is deviating away from said optimum selected for control.

4. A continuous optimal process controller according to claim 3 wherein said ratchet means is a ratchet type electrical relay.

5. A continuous optimal process controller according to claim 3 wherein said ratchet means is a pneumatic oscillator provided with a half cycle operation stopper consisting of a hold-up air capacity having sequentially coordinated air lock valves on input and output sides of said hold-up air capacity.

References Cited in the file of this patent

UNITED STATES PATENTS

| 1,985,829 | Hubbard | Dec. 25, 1934 |
| 2,005,773 | Florez | June 25, 1935 |
| 2,657,341 | Covert | Oct. 27, 1953 |

FOREIGN PATENTS

| 591,270 | Great Britain | Aug. 13, 1947 |
| 156,388 | Australia | May 7, 1954 |

UNITED STATES PATENT OFFICE
CERTIFICATE OF CORRECTION

Patent No. 3,152,602 October 13, 1964

James R. Hackman

It is hereby certified that error appears in the above numbered patent requiring correction and that the said Letters Patent should read as corrected below.

Column 6, line 46, for "closely" read -- closed --; column 9, line 70, for "plate" read -- pulse --.

Signed and sealed this 20th day of April 1965.

(SEAL)
Attest:

ERNEST W. SWIDER
Attesting Officer

EDWARD J. BRENNER
Commissioner of Patents